United States Patent [19]

Shimizu et al.

[11] 4,054,547

[45] Oct. 18, 1977

[54] POLYMERIZATION OF CHLOROPRENE

[75] Inventors: Akihiko Shimizu; Takao Hayashi, both of Shin-Nanyo, Japan

[73] Assignee: Toyo Soda Manufacturing Co., Ltd., Japan

[21] Appl. No.: 629,238

[22] Filed: Nov. 6, 1975

[30] Foreign Application Priority Data

Nov. 6, 1974 Japan .................................. 49-127058

[51] Int. Cl.$^2$ ............................................. C08L 11/02
[52] U.S. Cl. ........................ 260/29.7 SQ; 260/29.7 H
[58] Field of Search ................... 260/29.7 SQ, 29.7 H

[56] References Cited

U.S. PATENT DOCUMENTS

| | | | |
|---|---|---|---|
| 2,913,429 | 11/1959 | Floria et al. | 260/29.7 H |
| 3,306,871 | 2/1967 | Miller | 260/29.7 SQ |
| 3,317,451 | 5/1967 | Apotheker | 260/29.7 SQ |
| 3,401,213 | 9/1968 | Trementozyi et al. | 260/29.7 SQ |

Primary Examiner—M. J. Welsh
Attorney, Agent, or Firm—Oblon, Fisher, Spivak, McClelland & Maier

[57] ABSTRACT

A latex of chloroprene polymer is produced without using an emulsifier, which comprises polymerizing chloroprene by free radical polymerization, in an aqueous medium in the presence of 0.2 – 10 wt.% of styrene sulfonic acid or a derivative thereof, based on the total monomers added to the system. In a preferred embodiment the quantity of chloroprene added is 0.5 to 50% wt.

5 Claims, No Drawings

POLYMERIZATION OF CHLOROPRENE

BACKGROUND OF THE INVENTION

1. Field of the Invention

The present invention relates to a process for producing a latex of a chloroprene polymer without using a conventional emulsifier. More particularly, the present invention concerns a process for polymerizing chloroprene by free radical polymerization in an aqueous medium in the presence of styrene sulfonic acid or a derivative thereof in the absence of an organic emulsifier.

2. Description of the Prior Art

The term "latex of a chloroprene polymer" as used herein refers to a latex of a homopolymer of chloroprene or a copolymer of chloroprene and a comonomer having an ethylenically unsaturated double bond, which is dispersed in water.

Latexes of chloroprene polymers have been produced in the past by polymerizing chloroprene in an aqueous medium in the presence of a conventional organic emulsifier, such as a metal salt of a rosin acid, sodium alkylsulfate, and the like. However, various disadvantages are encountered when conventional organic emulsifiers are used. For example, the polychloroprene latex has a tendency to foam; and the physical properties and processability of chloroprene polymer prepared from the latex are often not satisfactory. In particular, it is known that the use of conventional organic emulsifiers are disadvantageous if the chloroprene polymer is to be used in a bonding composition. Further, the emulsifier solution is a potential pollution source and must be treated prior to discharge.

The conventional organic emulsifier is a low molecular weight compound which is only physical absorbed on latex particles. In order to overcome these disadvantages, it is necessary to prepare a latex which does not contain an emulsifier. Stabilized latexes of resinous polymers of styrene or methyl methacrylate have been prepared by using a polymerization initiator which contains a persulfate or a sulfonic acid group. Also stabilized latexes of styrene-butadiene polymers have been prepared by copolymerization with an unsaturated acid to introduce a carboxyl group. However, there is no known method for producing a stabilized polychloroprene latex which does not contain an emulsifier.

Accordingly, there exists a need for a process which can prepare stabilized chloroprene polymer latexes without the use of an emulsifier.

It was expected that the various disadvantages caused by a conventional organic emulsifiers could be alleviated by using a latex containing no emulsifier, however, it was totally unexpected that a stabilized latex would be prepared.

SUMMARY OF THE INVENTION

Accordingly, it is one object of the present invention to provide a process for producing a latex of chloroprene polymer which does not use a conventional organic emulsifier.

This and other objects of the invention, as will hereafter become more closer from the following description have been attained by the discovery that a latex of chloroprene polymer, which contains no emulsifier, can be produced by free radical-polymerization of chloroprene in an aqueous medium in the presence of 0.5 – 10 wt. % of at least one of styrene sulfonic acid and a derivative thereof based on total monomers added to the system.

The latex so produced has stability against ageing and chemical stability. The process for producing the latex of chloroprene polymer according to the invention comprises copolymerizing chloroprene and at least one of styrene sulfonic acid or a water soluble derivative thereof in an aqueous medium to form latex particles. The chloroprene polymer is internally included and sulfonic groups are partially present on the surface of the latex particles and the chloroprene polymer is formed by polymerization in the particles.

The styrene sulfonic acid and the derivatives thereof are compounds having the formula

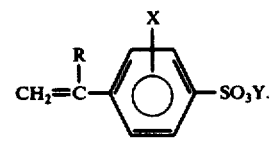

wherein R represents a hydrogen atom or a $C_{1-4}$ lower alkyl group; X represents a hydrogen atom, halogen atom, hydroxyl group or a $C_{1-4}$ lower alkyl group; and Y represents a hydrogen atom or an alkali metal e.g. sodium, potassium or a monovalent quaternary ammonium cationic group. The styrene sulfonic acid or a derivative thereof is added at a rate of 0.2 – 10 wt. % preferably 0.5 – 5 wt. % based on total monomers. It is possible to use one or more of styrene sulfonic acid and the derivatives thereof. The typical styrene sulfonic acid or the derivatives thereof include p-styrene sulfonic acid; sodium, potassium or quaternary ammonium salt of p-styrene sulfonic acid, sodium α-methyl-p-styrenesulfonate and O-chloro-p-styrenesulfonic acid or the like.

It is necessary to divide the chloroprene used for copolymerization with styrene sulfonic acid or a derivative thereof from the remaining chloroprene in principle. However, when chloroprene is not present at the initiation of the reaction, the hydrophilic property of the resulting polymer of the styrene sulfonic acid or the derivative thereof is too high. Accordingly, it is preferred to copolymerize chloroprene with more than 0.2 wt. % of styrene sulfonic acid or a derivative thereof. It is possible to add all of chloroprene at the initiation of the reaction. However, in said case, a W/O type emulsion is apparently formed. The W/O type emulsion is more precisely an O/W/O type emulsion having latex particles in W phase. The viscosity increase found is considered to be caused by the O/W/O structure. Even in such a case, when free chloroprene is adsorbed in the latex particles, the viscosity of the system decreases to the viscosity usual in emulsion polymerization, however, a small amount of coagulated material is formed. When 0.2 – 10 wt. % of styrene sulfonic acid or a derivative thereof based on the total amount of chloroprene is copolymerized with a part of the chloroprene of form latex particles and residual chloroprene is continuously or all at once added to the latex particles having 10 – 70% of a conversion, and the polymerization is continued, it is found that the increase of viscosity in the polymerization is minor and the formation of the coagulated material is small.

In another embodiment of the present invention from 0.5 – 50 weight percent of the total amount of a given amount of chloroprene to be polymerized or a mixture of chloroprene and a comonomer is polymerized by free radical polymerization in an aqueous medium in the presence of 0.2 – 10 weight percent based on the total monomer content of styrene sulfonic acid or a derivative thereof. Thereafter, the remaining amount of chloroprene is added to the reaction and the polymerization is continued.

It is possible to add a comonomer having an ethylenically unsaturated double bond in the copolymerization of chloroprene and styrene sulfonic acid or a derivative thereof. The comonomer can be added at the initiation of the reaction and can also be added at the time of addition of the residual chloroprene. Typical comonomers having an ethylenically unsaturated couple bond include 1-chlorobutadiene, 2,3-dichloro-butadiene, butadiene, 2-cyano-butadiene, styrene, acrylonitrile, alkyl methacrylate, alkyl acrylate or the like.

When the residual chloroprene is added, it is possible to add a small amount of the styrene sulfonic acid or a derivative thereof. In this manner, the stability of latex of chloroprene polymer rubber is further improved.

The polymerization initiator used in the process of this invention can be any or those initiators commonly used for free radical polymerization. It is especially preferable to use initiators having a persulfuric acid ion, which also contributes to the stabilization of the latex particles. Typical initiators are sodium, potassium and quaternary ammonium salts of persulfuric acid. The initiator having a persulfuric acid ion can be used by itself or with a reducing agent. The amount of the initiator is not critical and is usually in a range of 0.1 – 10 wt. % preferably 0.2 – 5 wt. %, to total monomers added in the system.

It is possible to add a molecular weight regulating agent, such as an alkyl mercaptan, a halogenated hydrocarbon, alkylxanthogendisulfide or sulfur.

The polymerization is conducted at 0° – 100° C, preferably 10° – 60° C at a weight ratio of total monomer to water in the system of 0.1 – 1.0, which is similar to that of conventional emulsion polymerizations. The pH of the system is not critical and can be in a range of 1.0 to 13.0. After the polymerization, the pH is usually decreased from the initial pH. However, it is possible to polymerize at a constant pH by use of a buffer solution. When the polymerization reaches a predetermined conversion of 40 – 100%, preferably 50 – 70%, a conventional polymerization terminating agent is added to terminate the polymerization. The residual monomers can be removed at elevated temperature by heating under reduced pressure.

Having generally described the invention, a more complete understanding can be obtained by reference to certain specific examples, which are included for purposes of illustration only and are not intended to be limiting unles otherwise specified.

In the examples, the term of part means part of weight unless otherwise specified.

EXAMPLES 1 – 4

Into a reactor having a nitrogen gas atmosphere, 100 parts of water and 4 parts of sodium styrene sulfonate were charged, and then each specific chloroprene containing 0.5 part of n-dodecyl mercaptan was added. At 40° C, 0.05 part of potassium persulfate and 0.025 part of sodium meta-bisulfite were added to the mixture to initiate the polymerization. After 10 minutes from the initiation of the polymerization, the formation the emulsion began. In the case of sequential addition, when a conversion of the initial polymerization reaches the predetermined degree stated in Table 1, a specific amount of chloroprene was added and the polymerization was continued. When the conversion reached 60%, the polymerization was terminated. The unreacted monomer was recovered under a reduced pressyre by flash distillation to obtain a latex of chloroprene polymer rubber. The amounts of chloroprene charged and the conversions at the latter addition and the polymerization results are shown in Table 1.

TABLE 1

| Example | Initial addition amount of C.P. (part) | Latter addition amount of C.P. (part) | Latter addition conversion (%) | Coagulated material (%) | Total Polymerization time (hour) |
|---|---|---|---|---|---|
| 1 | 100 | 0 | — | 1.50 | 3.0 |
| 2 | 10 | 90 | 65 | 0.57 | 2.3 |
| 3 | 30 | 70 | 60 | 0.48 | 1.8 |
| 4 | 30 | 70* | 60 | 0.05 | 3.0 |

Note:
1) C.P.:chloroprene
2) *:a continuous addition of chloroprene for 1 hour in the latter addition.

The resulting latexes were stable and exhibited pearl like luminescence and were not changed after 1 month from the formation of the latexes. Even when methanol was added to these latexes, no coagulation of the latex occurred. Accordingly, the latexes are chemically stable.

EXAMPLES 5 – 7

In accordance with the process of Examples 1 – 4 except using the compounds of Table 2 instead of sodium styrene sulfonate, polymerizations were conducted.

The results are shown in Table 2.

TABLE 2

| Example | Styrene sulfonic acid derivative | Polymerization time (hr) | Coagulated material |
|---|---|---|---|
| 5 | ammonium styrene sulfonate | 3.0 | <0.05% |
| 6 | sodium O-chlorostyrene sulfonate | 3.3 | " |
| 7 | sodium α-methylstyrene sulfonate | 3.5 | " |

The resulting latexes exhibited pearl like luminescence and were not changed after 1 month from the formation of the latexes, which demonstrates the ageing stability of the latex. Even when methanol was added to these latexes, no coagulation of the particles was found which demonstrates the chemical stability of the latex.

EXAMPLE 8

In accordance with the process of Example 3 except adding 0.5 part of sodium styrene sulfonate of the residual chloroprene monomer, polymerization was conducted. No coagulated material was formed during the polymerization. The resulting latex has stability in ageing and had chemical stability.

EXAMPLES 9 – 12

In accordance with the process of Examples 1 – 4 except adding each of comonomers stated in Table 3 with the chloroprene, the polymerization was conducted.

TABLE 4

| Example | Initial Addition monomer (part) | Latter addition monomer (part) | Polymerization time (hr) |
|---|---|---|---|
| 9 | C.P.: 25<br>2,3-DCB: 5 | C.P.: 65<br>2,3-DCB: 5 | 2.8 |
| 10 | C.P.: 30 | C.P.: 40<br>2,3-DCB: 30 | 2.8 |
| 11 | C.P.: 20 | C.P.: 70 | 3.5 |

TABLE 4-continued

| Example | Initial Addition monomer (part) | Latter addition monomer (part) | Polymerization time (hr) |
| --- | --- | --- | --- |
| 12 | St: 10<br>C.P.: 30 | C.P.: 40<br>MMA: 30 | 3.2 |

Note:
C.P.: chloroprene
2,3-DCB: 2,3-dichlorobutadiene
St: styrene
MMA: methyl methacrylate In all cases, the formation of coagulated material was less than 0.05% in the polymerization. The resulting latexes had excellent stability in ageing and chemical stability.

Having now fully described the invention, it will be apparent to one of ordinary skill in the art that many changes and modifications can be made thereof without departing from the spirit or scope of the invention as set forth herein.

What is claimed as new and intended to be covered by Letters Patent is:

1. A process for producing a latex of chloroprene polymer, which comprises:

polymerizing the chloroprene or a mixture of chloroprene and a comonomer by free radical polymerization in an aqueous medium in the presence of 0.2 - 10 weight percent based on the total monomers of a styrene sulfonic acid compound having the formula:

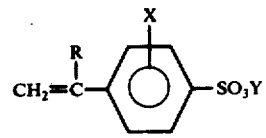

wherein R represents hydrogen or lower alkyl; X represents hydrogen, halogen, hydroxyl or lower alkyl; and Y represents hydrogen, an alkali metal or quaternary ammonium ion such that either (1) from 0.5 - 50 weight percent of the total amount of chloroprene or a mixture of chloroprene and a comonomer are polymerized in presence of said styrene sulfonic acid compound or (2) a portion of said chloroprene and styrene sulfonic acid compound is copolymerized to achieve a conversion of 10-70%, and after either (1) or (2) is completed, the residual chloroprene or monomer mixture is added to continue polymerization.

2. The process for producing a latex of claim 1, wherein 0.1 - 10 wt. % based on total monomers of an initiator for free radical polymerization is added to the aqueous medium.

3. The process for producing the latex of claim 1, wherein a molecular weight regulating agent is added to the aqueous medium.

4. The process for producing the latex of claim 1, wherein a ratio of total monomer to water is 0.1 - 1.0 by weight.

5. The process of producing the latex of claim 1 wherein both styrene sulfonic and a styrene sulfonic acid compound is added to the aqueous medium.

* * * * *